(12) United States Patent
Heinloth et al.

(10) Patent No.: US 9,707,632 B2
(45) Date of Patent: Jul. 18, 2017

(54) TOOL FOR THE TURNING/TURN BROACHING OF WORKPIECES

(71) Applicant: Kennametal Inc., Latrobe, PA (US)

(72) Inventors: Markus Heinloth, Postbauer-Heng (DE); Günter Sponsel, Steinsfeld (DE); Jan Grünler, Königshofen a. d. Heide (DE); Sebastian Föttinger, Gunzenhausen (DE)

(73) Assignee: KENNAMETAL INC., Latrobe, PA (US)

( * ) Notice: Subject to any disclaimer, the term of this patent is extended or adjusted under 35 U.S.C. 154(b) by 345 days.

(21) Appl. No.: 14/315,392

(22) Filed: Jun. 26, 2014

(65) Prior Publication Data

US 2015/0030397 A1 Jan. 29, 2015

(30) Foreign Application Priority Data

Jul. 23, 2013 (DE) .................. 10 2013 107 858

(51) Int. Cl.
*B23D 43/06* (2006.01)
*B23C 5/22* (2006.01)
*B23C 5/08* (2006.01)

(52) U.S. Cl.
CPC .............. *B23D 43/06* (2013.01); *B23C 5/08* (2013.01); *B23C 5/2226* (2013.01); *B23C 5/2234* (2013.01); *B23C 2210/16* (2013.01); *B23C 2240/24* (2013.01); *B23D 2043/063* (2013.01); *Y10T 407/15* (2015.01)

(58) Field of Classification Search
CPC ... B23C 2210/16; B23C 5/08; B23C 2240/24; B23C 5/2226; B23C 5/2234; B23D 2043/063; B23D 43/06
USPC .......................................... 407/12, 15, 16, 25
See application file for complete search history.

(56) References Cited

U.S. PATENT DOCUMENTS

| | | | | |
|---|---|---|---|---|
| 869,574 | A * | 10/1907 | Huther | B23D 61/026 125/15 |
| 1,495,067 | A * | 5/1924 | Conklin | B23F 21/166 144/237 |
| 2,394,035 | A * | 2/1946 | Blum | B23D 61/122 83/838 |
| 3,242,553 | A * | 3/1966 | Bogsten | B23C 5/22 407/100 |
| 3,812,755 | A * | 5/1974 | Danielsen | B23D 61/023 407/120 |
| 4,330,227 | A * | 5/1982 | Raye | B23C 5/2226 407/36 |
| 4,464,086 | A * | 8/1984 | Bentjens | B23C 5/12 407/25 |

(Continued)

FOREIGN PATENT DOCUMENTS

DE 102012009487 A1 * 11/2013 ............... B23C 9/00

*Primary Examiner* — Sara Addisu
(74) *Attorney, Agent, or Firm* — Ian K. Samways

(57) ABSTRACT

A tool for the turning/turn broaching of workpieces is provided, including a carrier which can be attached directly or indirectly to a machine tool with a plurality of segments which are fastened to the carrier. Each of the segments is provided with a plurality of tool bits. In addition, each of the segments is attached to the carrier by at least two fastening elements, which act obliquely to a plane (E) lying perpendicular to the rotational axis (R) of the tool.

19 Claims, 4 Drawing Sheets

(56) References Cited

U.S. PATENT DOCUMENTS

| | | | | |
|---|---|---|---|---|
| 4,533,281 A | * | 8/1985 | Lacey | B23C 5/242 |
| | | | | 407/36 |
| 4,563,929 A | * | 1/1986 | Ringlee | A01G 23/091 |
| | | | | 144/241 |
| 5,090,845 A | * | 2/1992 | Bentjens | B23C 5/08 |
| | | | | 407/52 |
| 5,158,400 A | * | 10/1992 | Skinner | B23F 21/243 |
| | | | | 407/12 |
| 5,761,981 A | * | 6/1998 | Stoffels | B23D 61/023 |
| | | | | 241/294 |
| 7,780,380 B2 | * | 8/2010 | Nagaya | B23B 29/043 |
| | | | | 407/101 |
| 8,678,714 B2 | * | 3/2014 | Sture | B23F 21/166 |
| | | | | 407/23 |
| 9,168,595 B2 | * | 10/2015 | Heinloth | B23C 5/006 |
| 2003/0123938 A1 | * | 7/2003 | Grehn | B23C 5/2493 |
| | | | | 407/36 |
| 2007/0140798 A1 | * | 6/2007 | Cole | B23C 5/2221 |
| | | | | 407/21 |
| 2012/0011979 A1 | * | 1/2012 | Hosp | B23C 5/006 |
| | | | | 83/663 |
| 2014/0013916 A1 | * | 1/2014 | Athad | B23D 61/04 |
| | | | | 83/676 |
| 2015/0063927 A1 | * | 3/2015 | Sjoo | B23F 21/106 |
| | | | | 407/28 |
| 2015/0147126 A1 | * | 5/2015 | Kim | B23C 5/08 |
| | | | | 407/15 |
| 2015/0174675 A1 | * | 6/2015 | Eisen | B23D 61/025 |
| | | | | 83/676 |

* cited by examiner

TOOL FOR THE TURNING/TURN BROACHING OF WORKPIECES

CLAIM TO PRIORITY

This application is a National entry application of German Application No. 102013107858.3, filed on Jul. 23, 2013, the entire contents of which is incorporated herein by reference.

FIELD OF THE INVENTION

The invention relates to a tool for the turning/turn broaching of workpieces, comprising a carrier which can be attached directly or indirectly to a machine tool and comprising a plurality of segments which are fastened to the carrier, wherein each of the segments is provided with a plurality of tool bits.

BACKGROUND OF THE INVENTION

Tools of this type for turning/turn broaching, as are used, for instance, for crankshaft machining, are already known from the prior art. Thus WO 2008/13311 A1 shows a tool for turning/turn broaching, which tool has a plurality of segments possessing a plurality of tool bits. In the tool known from the prior art, the segments are fastened to the carrier by means of a plurality of screws. In the solution known from the prior art, the screws engage radially in the carrier in order to fasten each segment to the carrier. Alternatively, the segments are fastened to the carrier by a clamping device with eccentric, wherein a clamping bolt of the clamping device is likewise radially arranged to fasten the segment to the carrier.

SUMMARY OF THE INVENTION

The object of the invention consists in refining the known tool such that the segments can be attached with higher precision to the carrier and can be exchanged individually with little effort.

For the achievement of this object, a tool for the turning/turn broaching of workpieces is provided, comprising a carrier which can be attached directly or indirectly to a machine tool and comprising a plurality of segments which are fastened to the carrier, wherein each of the segments is provided with a plurality of tool bits and is attached to the carrier by means of at least two fastening elements, which act obliquely to a plane lying perpendicular to the rotational axis of the tool. The basic idea of the invention consists in positioning the segments precisely in the axial direction by means of the obliquely oriented fastening elements. Due to the orientation of the fastening elements, the segments are clamped not only in the radial direction against the carrier, but at the same time in the axial direction against a suitable stop. The segments are hence positioned very precisely relative to the carrier. Moreover, the segments, since they are positioned individually on the carrier and do not have to support one another, can be removed and exchanged individually.

The angle between the direction of action of the fastening elements and the plane lying perpendicular to the rotational axis of the tool is preferably within the range from 5° to 25°, in particular in the order of magnitude of 8°. This angle serves to ensure that the segments, upon tightening of the fastening elements, are subjected to an axial force which is sufficiently large to position them in an axially exact manner.

In particular, screws are provided as the fastening elements, so that the fastening elements can be operated with standard tools and thus the segments can be fitted and removed with little effort.

According to one aspect of the invention, a driver, which acts between the carrier and the segment in the peripheral direction, is provided. By means of the driver, the transmission of shearing forces to the fastening elements in the event of further adjustment of the tool, and during operation thereof, is able to be prevented. In addition, when fitting the segments to the carrier, it is possible to ensure that the segments can be brought effortlessly into a position in which the fastening screws can engage in their associated threaded bores.

Preferably, the driver is attached to the carrier and engages in a recess on the segment. The driver can thus be exchanged with little effort should it be worn.

According to a further aspect of the invention, the carrier is provided with a collar against which the fastening elements pull the appropriate segment. The collar serves for the abutment of the segment in the axial direction, so that it is ensured that the segments have the intended position in the axial direction. For this purpose, the collar protrudes at an axial end of the carrier radially outward beyond a peripheral face of the carrier onto which the segments are mounted.

The collar can, in particular, be conFigured in one piece with the carrier, whereby axial tolerances which would be present in a two-part structure are avoided.

A further aspect of the invention provides that each of the fastening elements is arranged in a pocket, in which a clamping means for one of the tool bits is also provided. This simplifies the structure of the segments, since no additional pockets have to be created for the fastening elements. Moreover, it is thereby ensured that the segments can be equipped throughout with tool bits.

In the pocket is preferably fitted a loss prevention device for the fastening element, by which the fastening element can be secured, so that the fastening elements cannot get lost during handling of the segments.

According to a further aspect of the invention, a plurality of positioning elements, which guarantee a clear positioning of each segment on the carrier, are provided. For this purpose, the positioning elements are positioned in relative position to a predefined part of the carrier in such a way that only the appropriate segment intended for the appropriate portion of the carrier can be fitted there. This guarantees that the segments are not inadvertently mixed up during fitting, which would mean that, when the tool was used, the programmed position of a specific tool bit would not coincide with the actual position thereof.

In particular, the positioning element is realized as a pin, which, starting from a contact surface on the carrier, extends outward and projects into a bore in the appropriate segment. The pin here constitutes a particularly simple positioning element, which can be screwed, for instance, into a threaded bore in the carrier and, in case of wear, can be replaced by a new pin.

A further aspect of the invention provides that each segment, on its front and rear end viewed in the peripheral direction, is provided radially on the inside with a bevel. When a segment is exchanged, the receptacle on the carrier is usually cleaned with a cloth in order that dirt and dust do not impair the correct seating of the segment on the carrier. If only one of the segments is exchanged, dirt and dust between the remaining segments on the carrier must be wiped away. However, this is barely possible to exactly into the corner between carrier and remaining segment. The bevel on the segment means that in the region of each end of the segments, above the receptacle on the carrier, remains a free space, in which any residual dirt and dust do not pose a problem for the positioning of the segment on the carrier. It is preferable that the coolant duct is directed toward the main lip and forms a main coolant duct, making targeted cooling of the main lip possible.

BRIEF DESCRIPTION OF THE DRAWINGS

Further advantages and characteristics of the invention emerge from the following description and from the drawings, to which reference is made. In the drawings.

DETAILED DESCRIPTION OF THE INVENTION

Figure 1:
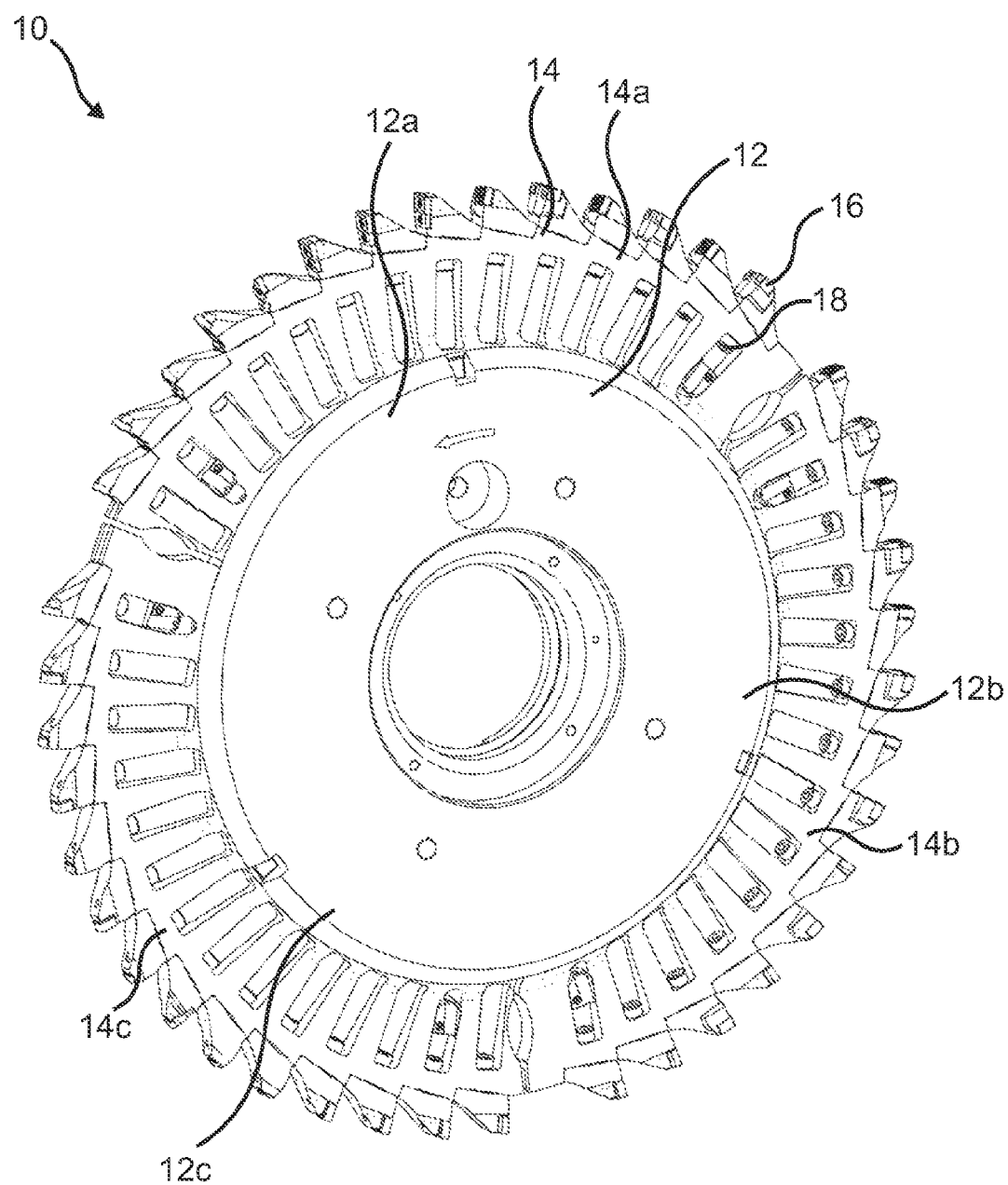
FIG. 1 shows a tool according to the invention for the turning/turn broaching of workpieces.

In FIG. 1, a tool 10 according to the invention for the turning/turn broaching of workpieces is shown. The tool 10 contains a carrier 12, which can be divided into a plurality of portions 12a, 12b, 12c. To each of the segments 12a to 12c is clearly assigned a specific segment of a plurality of segments 14, which is attached to the carrier 14 in the appropriate portion.

In the illustrative embodiment shown, three segments of equal length are used. Self-evidently, a differing number of segments can be used, for instance only two segments or a (very much) greater number of segments. Nor is it necessary for the segments to all have the same length.

Each of the segments 14 is provided with a plurality of tool bits 16, which are used to machine a workpiece (not represented here). The tool bits 16 are fastened to the segments 14 by means of cassettes, which are in turn fastened to the appropriate segment by clamping means 18.

The carrier 12 with the segments 14 can be attached directly or indirectly to a machine tool (not represented here).

The carrier 12 (see, in particular, FIG. 2) has a contact surface 20, onto which the segments 14 are mounted and to which they can be fastened. For the fastening of the segments 14, on the contact surface 20 are provided, peripherally distributed, a plurality of threaded bores 22, in which fastening elements (not represented here) of the segments 14 can engage. Each of the portions 12a-12c of the carrier 12 has two threaded bores 22. More than two threaded bores 22 per segment can also be used.

Figure 6:
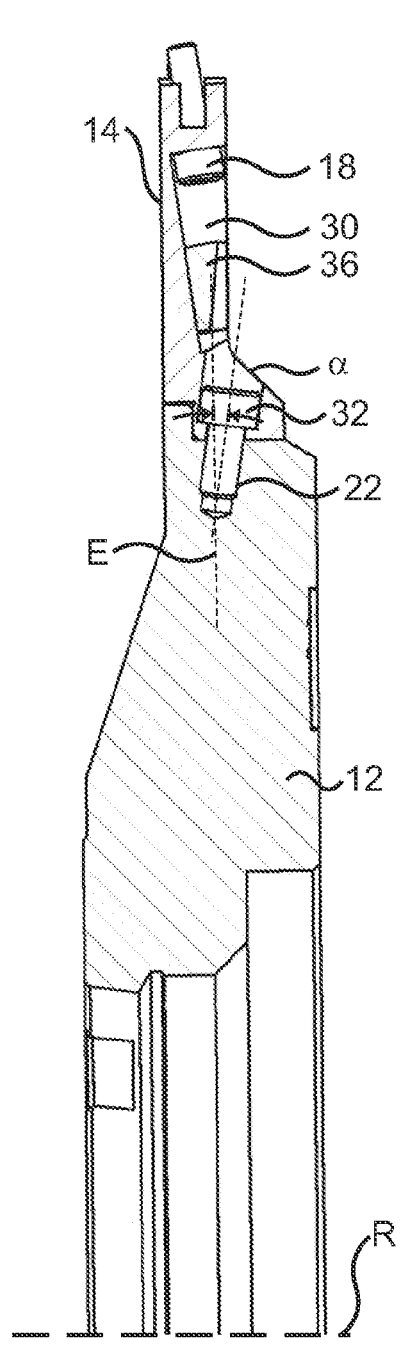
FIG. 6 shows a sectional representation through the tool in the region of a fastening element.

As can be seen, in particular, in FIG. 6, the threaded bores 22 are oriented obliquely in the carrier 12. The center axis of each threaded bore extends at an angle a relative to a plane which is perpendicular to the rotational axis R of the carrier and to the tool. The angle a lies within the range between 5° and 25° and can be, in particular, in the order of magnitude of 8°.

In addition, on the carrier 12 are provided a plurality of positioning elements 24, which ensure an exact, clear assignment of the segments 14 to the respective portions 12a-12c. For this purpose, the positioning elements 24 are arranged in a position, which is characteristic of each of the portions 12a to 12c, relative to a driver 26, a driver being provided for each of the portions 12a to 12c.

The positioning elements 24 are here realized as screw pins, which extend radially outward from the contact surface 20 of the carrier 12. The pins can be screwed into threaded bores in the carrier.

The drivers 26 are provided on the contact surface 20 of the carrier 12. Each of the three portions 12a-12c has a driver 26, wherein the drivers 26, viewed in the peripheral direction, are arranged centrally on the respective portion 12a-12c.

Figure 7:
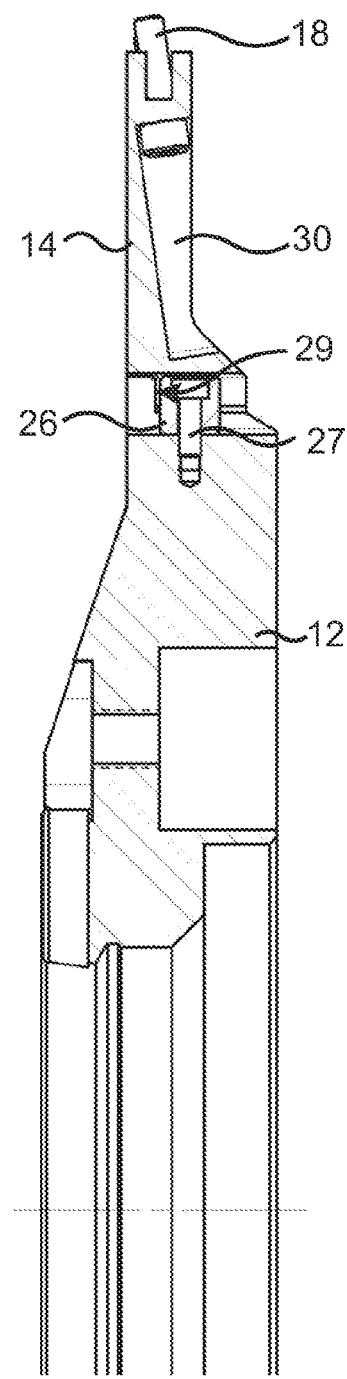
FIG. 7 shows a sectional representation in the region of the driver.

The drivers 26 are arranged on the carrier 12 in a groove-like depression, wherein the drivers protrude radially over the contact surface 20. Since the drivers 26 are fastened to the carrier 12 with screws 27 (see FIG. 7), they can be exchanged with little effort.

Figure 2:
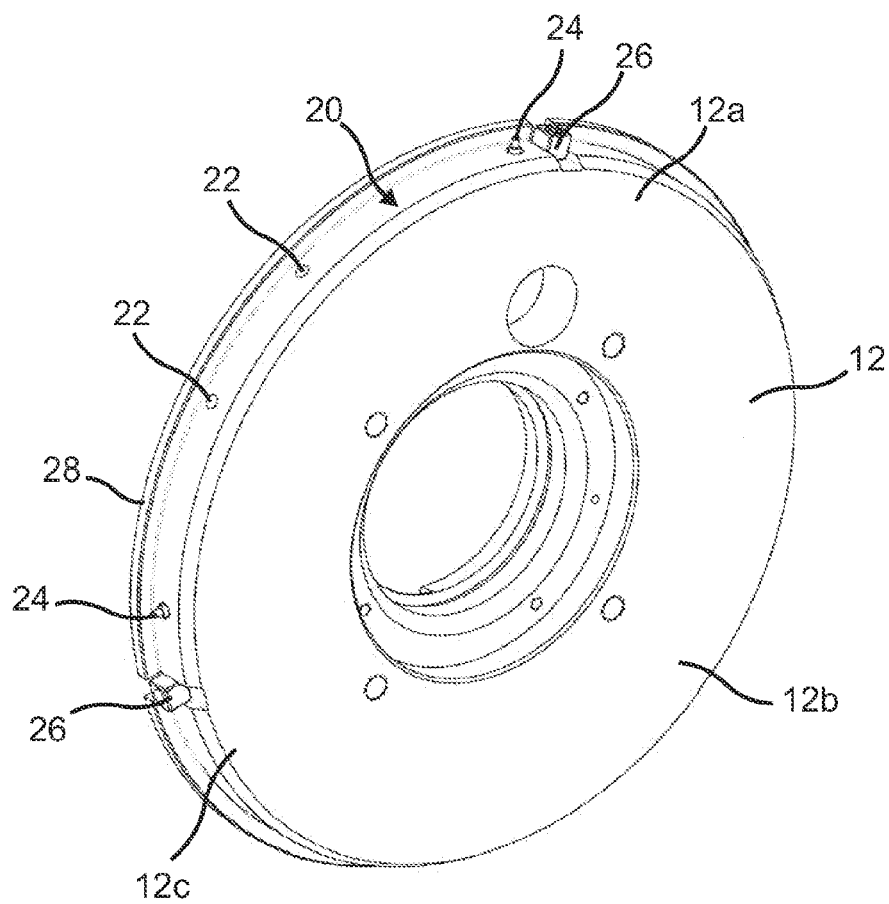
FIG. 2 shows the carrier from FIG. 1 without segments.

In addition, it is evident from FIG. 2 that the carrier 12 has a collar 28, which is arranged on an axial rim of the carrier 12 and protrudes peripherally, wherein the collar 28 can form a stop for the segments 14. The collar 28 is realized in one piece with the carrier 12, as is shown, in particular, in FIG. 6.

Figure 3:
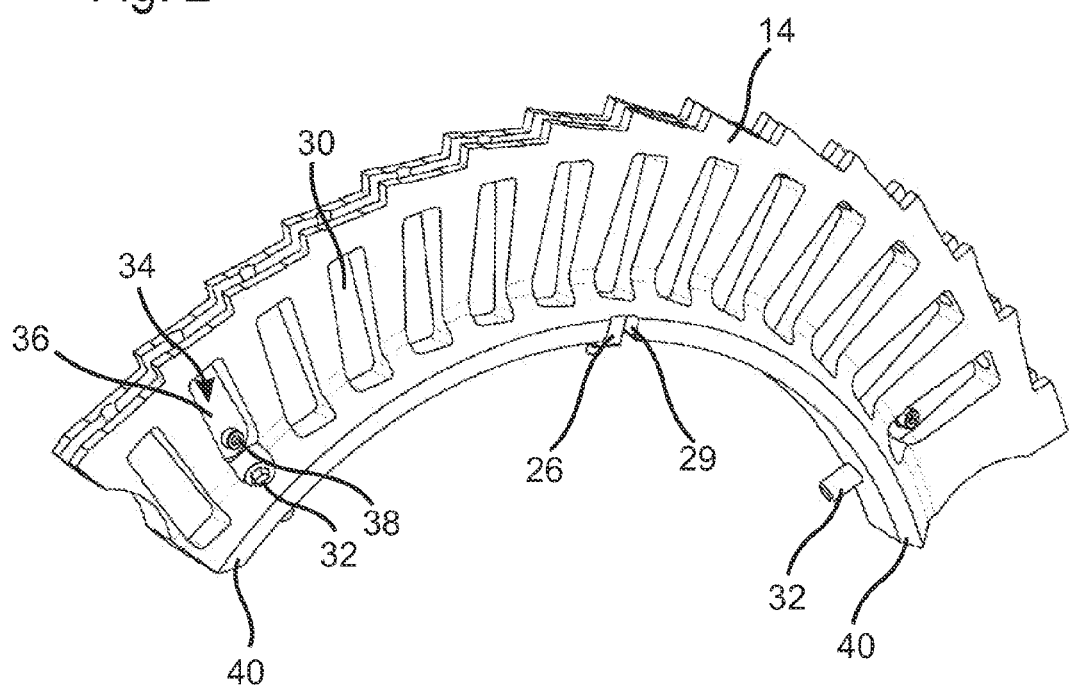
FIG. 3 shows a segment.

In FIG. 3 is shown one of the segments 14 which can be attached to the carrier 12. For better clarity, no tool bits 16 are represented. The segment 14 is represented with the driver 26 of the carrier 12, wherein the driver 26 is arranged actually on the carrier 12.

From FIG. 3, it becomes clear, however, that the driver 26 of the carrier 12 can cooperate with a recess 29 on the segment 14, which recess is conFigured centrally on said segment in the peripheral direction.

In addition, the segment 14 has a plurality of pockets 30, wherein a tool bit 16 or a cassette for a tool bit 16 is respectively assigned to a pocket 30. The pockets 30 have openings, through which the clamping means 18 for the tool bits 16 or their cassettes are guided in order to fasten the tool bits 16 to the segment 14 (see FIG. 1).

Each of the segments 14 is provided with two fastening elements 32, which are arranged in respectively one of the pockets 30. The fastening elements 32 are here realized as screws.

In the pockets 30, which are provided with the fastening elements 32, is respectively arranged a loss prevention device 34. The loss prevention device 34 is conFigured in FIG. 3 as a screw 38, which is provided in the appropriate pocket 30. Alternatively, a block 36 can be used (see FIG. 6), which is fitted in the appropriate pocket. The loss prevention devices 34 see to it that the fastening elements 32 cannot get lost during handling of the segments.

Moreover, each of the segments 14 respectively has on its two ends, viewed in the peripheral direction, a bevel 40, the function of which is described later. Moreover, on each of the ends is provided an arc-shaped constriction, by which the appropriate segment can be gripped.

The segment 14 is conFigured in total as an arc-shaped element, which extends over an angular range of approximately 120°.

Figure 4:
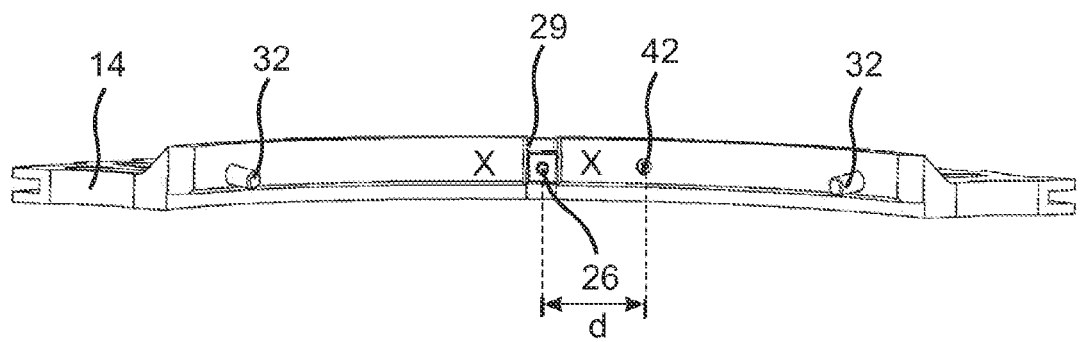
FIG. 4 shows the segment from FIG. 3 from a different perspective.

FIG. 4 shows the segment 14 of FIG. 3 from a different perspective from below, wherein the fastening elements 32, as well as the recess 29 together with accommodated driver 26, can be clearly seen.

In addition, each segment 14 has on its bottom side a bore 42, which can cooperate with one of the positioning elements 24 on the carrier 12 when the segment 14 is placed onto the carrier 12, as is described below. The distance of the bore 42 from the appropriate recess 29 is in each segment 14 clearly tailored to the portion 12a, 12b or 12c in which the appropriate segment 14 shall be fitted. In FIG. 4, the positions of the bore 42 for the two further segments are marked with an "X".

From the relative position of the bore 42 to the recess 29, here over the distance d, in combination with the positioning elements 24, it is ensured that the segment 14 can be attached only to the respectively provided portion 12a-12c of the carrier 12. Should an attempt be made to attach a segment 14 to a "wrong" portion 12a-12c of the carrier 12, then the segment 14 cannot be brought into contact with the contact surface 20, since for the radially outwardly protruding positioning element 24 there is no appropriate bore 42 present in the "wrong" segment 14. The operator of the tool 10 therefore quickly establishes that the segment 14 is wrongly assigned, since he is unable to fasten it to the carrier 12.

The segment 14 shown in FIGS. 3 and 4 corresponds to the segment 14c from FIG. 1, which is attached to the portion 12c of the carrier 12. The relative positioning of the positioning element 24 to the driver 26 of the portion 12c emerges from FIG. 2. It corresponds to the relative positioning of the bore 42 to the recess 29, and thus to the distance d.

Figure 5:
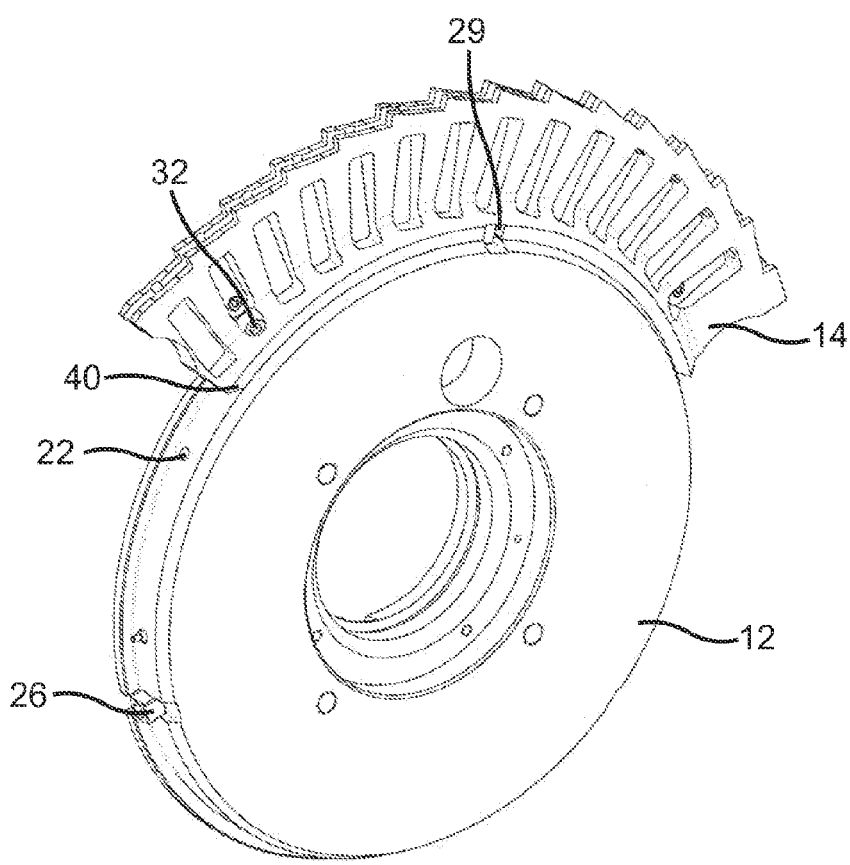
FIG. 5 shows the tool from FIG. 1 with only one segment and without tool bits.

In FIG. 5, the carrier 12 is shown with the thereto attached segment 14 from FIG. 3. Following the fastening of the first segment 14, the further segments 14 can be fastened to the carrier 12 in order to arrive at the tool 10 from FIG. 1.

For the fitting of the segments 14, these are mounted onto the contact surface 20 in the appropriate portion 12a-12c, though this is only possible if the positioning element 24 of the appropriate portion 12a to 12c can extend into the bore 42 of the mounted segment 14. The correct positioning of the segment as it is mounted onto the carrier is aided by the driver 26 of the carrier 12, which driver engages in the recess 29 of the segment 14. The recess 29 and the driver 26 can be clearly seen, so that the segment can be brought without difficulty into the intended position, in which the fastening elements 32 lie opposite the threaded bores 22 on the carrier 12.

For the fastening of the segments 14, the two fastening elements 32 are then screwed into the threaded bores 22 on the carrier 12.

This tilt of the fastening elements 32 (angle α) serves to ensure that the segments 14, upon fastening to the carrier 12 or upon tightening of the fastening elements 32, are clamped not only peripherally against the contact surface 20, but also in the axial direction against the collar 28, which acts as an axial stop for the segments 14.

Once the segments 14 are fastened to the carrier 12, the tool 10 can be used to machine a workpiece.

Should an exchange of a segment 14 be necessary, then the latter can be easily changed by undoing the fastening elements 32 and removing the appropriate segment 14 from the carrier 12.

Due to the loss prevention device 34, it is guaranteed that the fastening elements 32 cannot get lost during handling.

Following the removal of the segment 14, a cloth, for instance, can be used to wipe over the partial area of the contact surface 20, whereby the contact surface 20 is cleaned. Possible dust particles or chip residues could hereupon be accidentally pushed into the transition region to the adjacent segment 14 or cannot be removed there.

Due to the bevels 40 conFigured on the peripheral ends of the segments 14, this does not, however, pose a problem, since the segments 14 do not in these regions come into contact with the contact surface 20. The bevels 40 thus serve to ensure that the newly inserted segment 14 can likewise be positioned exactly on the carrier 12.

There is thus created a tool 10, the segments 14 of which, due to the fastening elements 32 arranged obliquely to the plane E, reach their exact, predefined position. Due to the clear assignment by means of the positioning elements 24, furthermore, the changing of the segments 14 is ensured. Moreover, due to the bevel 40, an exact positioning of the segments 14 on the carrier 12 upon changing of the segments 14 is guaranteed.

What is claimed is:

1. A tool for the turning/turn broaching of workpieces, comprising a carrier which can be attached directly or indirectly to a machine tool and comprising a plurality of segments which are fastened to the carrier, wherein each of the segments is provided with a plurality of tool bits, wherein each segment is attached to the carrier by means of at least two fastening elements, which act obliquely to a plane lying perpendicular to the rotational axis of the tool;
wherein each of the fastening elements is arranged in a pocket, in which a clamping means for one of the tool bits is also provided.

2. The tool as claimed in claim 1, wherein the fastening elements are screws.

3. The tool as claimed in claim 1, wherein a driver is provided that acts between the carrier and the segment in the peripheral direction.

4. The tool as claimed in claim 3, wherein the driver is attached to the carrier and engages in a recess on the segment.

5. The tool as claimed in claim 1, wherein the carrier is provided with a collar against which the fastening elements pull the appropriate segment.

6. The tool as claimed in claim 1, wherein a loss prevention device for the fastening element is fitted in the pocket.

7. The tool as claimed in claim 1, wherein a plurality of positioning elements, which guarantee a clear positioning of each segment on the carrier, are provided.

8. The tool as claimed in claim 7, wherein the positioning element is realized as a screw pin, which, starting from a contact surface on the carrier, extends outward and projects into a bore in the appropriate segment.

9. The tool as claimed in claim 1, wherein each segment, on its front and rear end viewed in the peripheral direction, is provided radially on the inside with a bevel.

10. A tool for the turning or turn broaching of workpieces, said tool comprising:
a carrier which is attachable directly or indirectly to a machine tool; and
a plurality of segments fastened to the carrier, wherein each of the segments is provided with a plurality of tool bits;
each of the segments being fastened to the carrier via at least two corresponding fastening elements;
wherein each of the fastening elements acts obliquely with respect to a plane lying perpendicular to the rotational axis of the tool, and pulls the corresponding segment toward an axial stop;
wherein each of the fastening elements is arranged in a pocket of the corresponding segment; and
wherein each pocket includes a clamping arrangement for a corresponding one of the tool bits.

11. The tool as claimed in claim 10, wherein:
the carrier comprises a peripheral face onto which the segments are fastened; and the axial stop protrudes radially outwardly beyond the peripheral face of the carrier.

12. The tool as claimed in claim 11, wherein the axial stop protrudes radially outwardly beyond the peripheral face of the carrier, at an axial end of the carrier.

13. The tool as claimed in claim 11, wherein the axial stop comprises a collar which is fixed with respect to the carrier.

14. The tool as claimed in claim 13, wherein the collar and carrier are configured in one piece with respect to one another.

15. The tool as claimed in claim 10, wherein the fastening elements comprise screws.

16. The tool as claimed in claim 10, further comprising:
a driver which acts, in a peripheral direction, between the carrier and at least one of the segments;
wherein the driver is attached to the carrier and engages in a recess on the at least one of the segments.

17. The tool as claimed in claim 10, wherein a loss prevention device for the fastening element is fitted in the pocket.

18. The tool as claimed in claim 10, further comprising:
a plurality of positioning elements, which guarantee a clear positioning of each segment on the carrier;
wherein each positioning element comprises a screw pin which, starting from a contact surface on the carrier, extends outwardly and projects into a bore in the corresponding segment.

19. The tool as claimed in claim 10, wherein each segment, on its front and rear end viewed in a peripheral direction, is provided radially on the inside with a bevel.

\* \* \* \* \*